United States Patent [19]
Wesley

[11] Patent Number: 6,076,114
[45] Date of Patent: Jun. 13, 2000

[54] METHODS, SYSTEMS AND COMPUTER PROGRAM PRODUCTS FOR RELIABLE DATA TRANSMISSION OVER COMMUNICATIONS NETWORKS

[75] Inventor: Ajamu A. Wesley, Raleigh, N.C.

[73] Assignee: International Business Machines Corporation, Armonk, N.Y.

[21] Appl. No.: 08/844,392

[22] Filed: Apr. 18, 1997

[51] Int. Cl.[7] .............................. G06F 13/38; G06F 15/17
[52] U.S. Cl. ...................... 709/235; 709/230; 370/230; 714/748
[58] Field of Search ................................... 709/224, 230, 709/235, 237; 370/229, 230, 231; 714/748, 749

[56] References Cited

U.S. PATENT DOCUMENTS

| | | | |
|---|---|---|---|
| 3,587,044 | 6/1971 | Jenkins . | |
| 5,490,152 | 2/1996 | Gregg et al. | 714/748 |
| 5,627,970 | 5/1997 | Keshav | 709/237 |
| 5,664,091 | 9/1997 | Keen | 714/748 |
| 5,696,948 | 12/1997 | Cruz et al. | 709/224 |
| 5,802,106 | 9/1998 | Packer | 370/230 |
| 5,894,559 | 4/1999 | Krishna et al. . | |
| 5,918,002 | 6/1999 | Klemets et al. | 714/749 |

OTHER PUBLICATIONS

Tanenbaum, Andrew S., *Computer Networks*, Ch. 1, pp. 1–51, Prentice Hall (2nd Ed., 1988).
Comer, Douglas E., *Internetworking with TCP/IP vol. I: Principles, Protocols, and Architecture*, Ch. 12 & 13, Prentice Hall (3rd Ed., 1995).
Balakrishnan, et al, A Comparison of Mechanisms for Improving TCP Performance over Wireless Links, *ACM SIGCOMM '96*, pp. 1–14 (Aug. 1996).

*Primary Examiner*—Mark H. Rinehart
*Attorney, Agent, or Firm*—Myers Bigel Sibley & Sajovec; Jeanine S. Ray-Yarletts

[57] ABSTRACT

Methods, systems and computer programs provide reliable transmission of data over a communications link in a communications network which otherwise may be unreliable. The transmission of the data packets in a communications link between a sending station and a receiving station is reliably managed by biasing the expected round trip time associated with the first sending station to accommodate relatively large fluctuations in the actual latency of transmissions in the data packets between the sending station and the receiving station whereby the number of retransmissions of data packets between the sending station and the receiving station is relatively minimized. The retransmission of data packets is controlled by first modifying the expected round trip time associated with the first computer causing the expected round trip time to approach the largest actual latency experienced by the sending station and also to account for the size of the data packets successfully transmitted between the sending station and the receiving station. The retransmission of the data packets may also be controlled by dynamically regrading the round trip time associated with the sending station based on an indication by the receiving station that the communications link can be trusted. The round trip timer is regraded by dynamically increasing the expected round trip time based on the successful transmission of a data packet on the first attempt and is dynamically decreased based on the unsuccessful transmission of the data packet on the first transmission attempt. The communications network may be a wired communications network, a wireless communications network, or a combination of wired and wireless communications networks.

14 Claims, 8 Drawing Sheets

METHODS, SYSTEMS AND COMPUTER PROGRAM PRODUCTS FOR RELIABLE DATA TRANSMISSION OVER COMMUNICATIONS NETWORKS

FIELD OF THE INVENTION

This invention relates to data transmissions, and more particularly, to the reliable transmission of data over communications networks using a modified transport protocol.

BACKGROUND OF THE INVENTION

A communications system or network may be generally defined as a collection of computers or computing systems which interact or transmit data from one computer (i.e., node) on the network to another. The functional capabilities of the nodes may range from terminals with minimal local processing capability to complex multiprocessors capable of high speed local processing. A node incorporates a set of control functions required to insure that network interfaces comply with networking standards or architectures. These control functions may be grouped into sets based on function. For example, in the Systems Network Architecture ("SNA") developed by International Business Machines Corporation ("IBM"), the assignee of the present invention, SNA defines a Physical Unit ("PU") which controls operation of real network resources such as links, and a Logical Unit ("LU") which controls logical software based entities such as applications. Other networking architectures define similar functional groupings.

The communications facilities which interconnect the nodes also may vary, ranging from high speed input/output ("I/O") channels to low speed, point-to-point telephone lines. By way of example, the media used to implement the communications facilities may include satellite links or wide band optical fibers.

Referring now to FIG. 1, a high level block diagram depicting a computer network is illustrated at 10. For purposes of illustration, the computer network 10 is shown as including a first computer which may be a sender or transmitter station 12 and a second computer which may serve as a receiver station 14. It will be understood by those skilled in the art that stations 12 and 14 may each act as either a sender, a receiver, or both a sender and a receiver, depending on whether the station is sending or receiving data. Generally, sender station 12 will include a central processing unit ("CPU") 16 and memory 18. The CPU runs the operating system 20 of sender station 12. In addition, the CPU 16 may run application programs or user operations of sender station 12. Sender station 12 interfaces with communications network 30 through communications interface 21. Communications network 30 may include satellite links or terrestrial links such as a T1 or T3 transmission link. In addition, a portion of communications network 30 may be a wired network or a wireless network. Communications interface 21 may be a modem or other means for interfacing between a station and communications network 30 in transmitting data packets.

Likewise, receiver station 14 includes a CPU 22, memory 24 and an operating system 26. CPU 22 may run application programs or user operations of receiver station 14. In addition, receiver station 14 interfaces with communications network 30 through a communications interface 27 for transmitting data packets.

The elements described above are known to those of ordinary skill in the art and will not be described further herein. It will be understood by those skilled in the art that user application programs of sender station 12 may provide user data for transmission to receiver station 14 and the received user data may be provided to the user application program of receiver station 14.

Still further, it will be understood by those skilled in the art that stations 12 and 14 may be mainframe computers such as an IBM System/390, a midrange computer such as an IBM AS-400, a server, a workstation or a personal computer. In addition, in the context of the "information superhighway" and the Internet, the sending station may be an Internet client (e.g., browser) and the receiving station 14 may be an Internet server.

Overview: Network Layers and Protocols

Generally, computer networks may be organized in a series of layers or levels, each layer or level being built on top of the layer or level immediately below it. The number of layers in a network design or architecture varies from network to network. In addition, the name, content and function of each layer also may differ. Nonetheless, each layer offers services to the layers above it, shielding those higher layers from the details of how the offered services are actually implemented. A particular layer on one computer in a network carries on a conversation with the corresponding layer in another computer in the network. The rules and convention used to implement communications between a particular layer on different computers in a network may be referred to as "protocols." The layers and protocols may be referred to as the network architecture.

By way of example, the present invention may function in various different network environments. For purposes of illustration, one example of a network architecture is the International Standards Organization ("ISO") Open Systems Interconnection ("OSI") reference model. As illustrated in FIG. 2, the OSI model has seven layers. Under the OSI model, the seven layers will be present at each computer on the network. For example, the seven layers may be present at the sender station 12 and also present at the receiver station 14. In addition, the three lowest layers may be present generally at routers on the network or at the communication subnet boundary.

As illustrated in FIG. 2, the layers of the OSI model include the physical control layer 202 which connects adjacent nodes physically and electrically for physically transporting bits from one machine to another, the data link control layer 204 which constructs frames from the raw bit stream for transmitting data between adjacent nodes and detecting and recovering from transmission errors in a way transparent to higher layers, the network control layer 206 (sometimes referred to as the path control layer) which routes data between source and destination nodes and controls data traffic in the network, and the transport control layer 208 (sometimes referred to as the transmission control layer) which creates, manages and deletes transport connections (i.e., session). The OSI model also includes the session control layer 210 (sometimes referred to as the data flow control layer) which synchronizes data flow between end points of a session so as to establish and control a session between two end users for conversation purposes, the presentation services layer 212 which formats data for different presentation media and coordinates the sharing of resources, and provides application services such as distributed database access and document interchange, and finally, the network user or application layer 214 which relates to the conversation per se between two end users. The concepts of network modeling and architecture, as well as layers, and the OSI model are described in detail in Chapter 1 of the textbook entitled "Computer Networks" by Tanenbaum, Prentice Hall, Inc. (2nd ed., 1988), which is incorporated herein by reference.

As previously indicated, the rules and conventions for operating at the various layers in a network model may be referred to as protocols. There are a number of different protocols used for implementing network models. In addition, these protocols may themselves be layered. One example of the network protocol layering design is illustrated in FIG. 3 generally at 300. This network protocol layering design may be used in the context of the Internet. In particular, the conceptual layering illustrated in FIG. 3 includes the network interface layer 302, the Internet protocol ("IP") layer 304, the transport protocol layer 306 and the application layer 308. There are several different protocols that may be used at the transport layer 306, including, for example, the Transmission Control Protocol ("TCP") 306a and the User Datagram Protocol ("UDP") 306b.

Transport Layer Protocols

TCP is a communications protocol that specifies the format of the data and acknowledgements that two computers exchange to achieve a reliable transfer. In addition, it specifies the procedures the computers use to insure that the data arrives correctly. TCP may be used with various data packet delivery systems, including the IP datagram delivery service. TCP resides above the IP protocol layer in the protocol layering scheme illustrated in FIG. 3. As such, TCP allows multiple application programs on a given computer to communicate concurrently, and it demultiplexes incoming TCP traffic for use by the various application programs. In addition, TCP guarantees that data is received in the appropriate order.

TCP provides positive acknowledgements and packet reordering. The purpose of the positive acknowledgements is to notify the sender that the data has been received correctly. Acknowledgements may occur in a number of ways, including in the form of a "piggyback" acknowledgement and a "non-piggyback" acknowledgement. A piggyback acknowledgement refers to an acknowledgement which is included in a data packet which is carrying user data in addition to the acknowledgement. A non-piggyback acknowledgement refers to an acknowledgement which is transmitted back to the sending station in its own packet which contains no user data. As a result, TCP uses data retransmissions with positive acknowledgement in order to increase the reliability of IP which is otherwise an unreliable network protocol.

UDP, which is another example of a transport layer protocol, uses the underlying IP to transport messages from one machine to another. It does not insure correct delivery of data packets. Further, it does not insure the correct ordering of incoming data packets and does not provide feedback to control the rate at which information flows between computers in a network. Rather, UDP simply enables the delivery of data packets to the correct receiver station and the delivery of a reply from the receiver station to the sender. As a result, UDP may be referred to as an unreliable connectionless delivery service.

TCP and UDP transport layer protocols are described in detail in Chapters 12 and 13 of the textbook entitled "Internet Working With TCP/IP Vol. I: Principles, Protocols, and Architecture," by Comer, Prentice Hall, Inc. (3rd ed. 1995), which is incorporated herein by reference.

TCP was designed and implemented generally for use in "wired" communications networks. As such, TCP generally assumes that a local area network ("LAN"), and in particular, an "ethernet" would form the physical layer in the network model. However, data packet loss may commonly occur in networks. The occurrence of data packet loss may be attributed to network congestion such as Ethernet collisions. A related protocol has been developed for use in combination with TCP to address data packet loss. This protocol may be referred to as "Slow Start & Sliding Window Protocol".

Although TCP provides relatively good performance in a wired network, the performance level of TCP may be reduced drastically in a "wireless" network. The drastic reduction in performance in a wireless network while implementing TCP may be a result of, at least in part, the various reliability mechanisms provided by TCP, including positive acknowledgements and packet reordering. As a result, TCP may be inefficient for use in a wireless network.

In contrast, the performance level of UDP in a wireless network may be greater than the performance level of TCP. Unlike TCP, UDP does not provide the reliability for use in wired networks. However, it does provide increased performance over TCP in wireless networks. The better performance of UDP over TCP in wireless networks may be due to, at least in part, the fact that UDP does not provide the various reliability features provided by TCP. For example, as previously indicated, UDP does not provide for acknowledgements, ordering of incoming messages, or feedback regarding the rate of data flows. As such, UDP may be preferred over TCP in wireless networks notwithstanding the fact that UDP may be generally unreliable.

Wired/Wireless Communications Networks

The growth in popularity of wired networks, such as the Internet, and wireless networks, such as mobile computing or communications, has resulted in an increased interest in combining wired networks and wireless networks. The remote links may include a wireless radio frequency ("RF") modem and a radio tower. Data transmission on wireless networks is considered to be relatively slow in comparison to data transmission on wired networks. Moreover, wireless networks are typically unstable in that external interference and noise has a greater impact in wireless environments than in wired environments. However, a hybrid network having wired characteristics and wireless characteristics may render conventional transport protocols such as TCP ineffective.

Network instability in wired networks, and consequently, hybrid networks, in terms of latency and throughput may be affected by network congestion. Moreover, the round trip time (i.e., the total time from when sending station sends a data packet until the sending station receives an acknowledgement of receipt of the data packet from the receiving station) cannot be precisely measured in hybrid networks using either wired or wireless network technology. This is due, at least in part, to the significant fluctuations in data packet delivery which occur in these hybrid networks. As a result of the relatively large fluctuations in latency in the hybrid networks, transport protocols such as TCP assume that a packet loss has occurred and resend the data packet. In addition, transport protocols such as UDP do not address data loss. As a result, a decrease in throughput occurs.

Moreover, since the latency experiences relatively large fluctuations particularly, in the upward direction, the size of the window of the sending station in TCP (i.e., the number of bytes that the sending station will transmit in one packet) is reduced. Consequently, a variable delay occurs before the data transmissions begin and a "slow" expansion of the window size takes place. In order to address the reduction in the window size, many wireless networks provide a fixed packet size. However, with the reduction in the window size, a transport protocol such as TCP causes an increase in internal packet fragmentation in the communications stack.

In addition, the internal fragmentation of packets in the communications stack attributed to TCP may result in an average throughput efficiency of only fifty percent (50%) in some wireless networks. This poor efficiency level may be attributed to the inability to resolve fixed packet sizes required in the underlying hybrid network. Consequently, layers 2 and 3 in a network model such as the OSI model, may not be able to accurately compute the maximum transmission unit ("MTU").

Still further, the different types of acknowledgement, namely, piggyback and non-piggyback, may also affect fragmentation of data packets in the communications stack. In particular, as the number of non-piggyback acknowledgements increase, the occurrence of internal packet fragmentation increases.

For the reasons identified above, the rather pure relationship between latency, throughput and data loss does not exist in a wireless environment or in a hybrid environment. Rather, interference and noise have a greater adverse effect on wireless and hybrid networks than on wired networks. In addition, the protocols which route data to and from the wireless network interfaces utilize buffering techniques, prioritized transmissions and slotting protocols which introduce significant variations in latency independent of data packet discardation or loss.

As a result, the existing transport layer protocols may not effectively address the design concerns of latency, throughput and data loss avoidance in a wireless network, or in a hybrid network combining a wireless network and a wired network. In order to improve performance in a wireless or a hybrid network, and consequently, reliability, the design concerns of latency, throughput and data loss avoidance must be addressed.

SUMMARY OF THE INVENTION

It is, therefore, an object of the present invention to provide methods, systems and computer program products which can improve the reliability of data transmission in a communications network.

It is another object of the present invention to provide methods, systems and computer program products which can improve the reliability of data transmissions in wireless communications networks and in hybrid communications networks combining a conventional wired network with a wireless network.

It is still a further object of the present invention to provide methods, systems and computer program products which can improve the reliability of data transmissions in a communications network by addressing the design issues of latency, throughput and data loss avoidance.

These and other objects are provided according to the present invention by methods, systems and computer program products for reliably managing the transmission of data packets in a communications network, and in particular, over a communications link between a first computer and a second computer based on a biased expected round trip time associated with the first computer, the biased expected round trip time being biased as a function of fluctuations in the latency of transmissions in data packets between the first computer and the second computer whereby the number of retransmissions of data packets is reduced. The invention is described in an environment in which an IP communication protocol is used and the computer network is a hybrid network having a combination of a conventional wired network and a wireless network; however, the invention is not restricted to any particular type of network or any particular type of communication protocol. Rather, the invention may be applicable to not only hybrid networks, but also wireless networks as well as wired networks.

The retransmission of data packets is controlled by first modifying the expected round trip time associated with the first computer as a function of the largest latency experienced by the first computer corresponding to successful transmissions and the size of the data packets successfully transmitted between the first computer and the second computer. Thereafter, the retransmission of data packets between the first computer and the second computer is controlled based on the modified expected round trip time associated with the first computer.

The expected round trip time is modified by first comparing the expected round trip time determined by the first computer and the actual round trip time corresponding to the time a current data package was successfully transmitted between the first computer and the second computer. The expected round trip time is modified in response to the comparison and the size of the current data packet which was successfully transmitted between the first computer and the second computer. In particular, the expected round trip time is modified in that it is expanded if the actual round trip time is at least as great as the expected round trip time, and is reduced if the expected round trip time is greater than the actual round trip time.

In addition, the retransmission of the data packet between the first computer and the second computer may be controlled by dynamically regrading the expected round trip time associated with the first computer based on the history of successful transmissions of data packets between the first computer and the second computer and controlling the retransmission of a data packet between the first computer and the second computer based on the regraded expected round trip time. In particular, the expected round trip time is regraded by dynamically increasing the expected round trip time based on the history of successful transmissions of data packets between the first computer and the second computer and is dynamically decreased based on the history of unsuccessful transmissions of data packets between the first computer and the second computer.

The retransmission of data packets from the first computer to the second computer may also be controlled according to the present invention by acknowledging that the data packets were received by the second computer, determining the latency associated with each of the data packets transmitted to the second computer, modifying the expected round trip time associated with the first computer as a function of the largest latency of the first computer corresponding to the transmission of the data packets and the size of the data packets successfully transmitted, and controlling the retransmission of the data packets based on the modified expected round trip time associated with the first computer.

Still further, the communications link according to the present invention may be a wired communications link, a wireless communications link, or a combination of a wired and a wireless communications link.

DESCRIPTION OF THE PREFERRED EMBODIMENT

Figure 1:
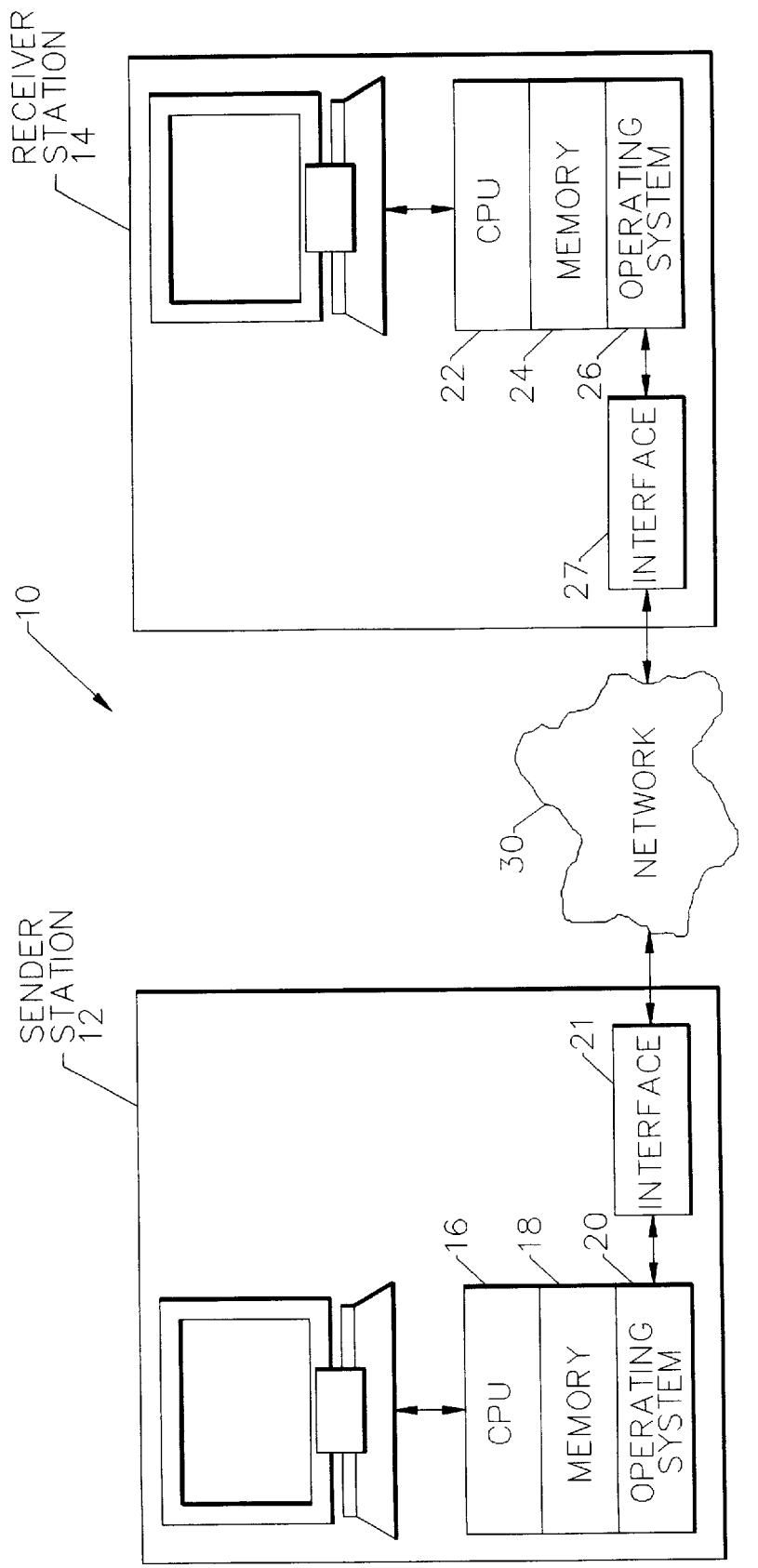
FIG. 1 is a block diagram illustrating a communications network environment in which the present invention may operate.
Figure 2:
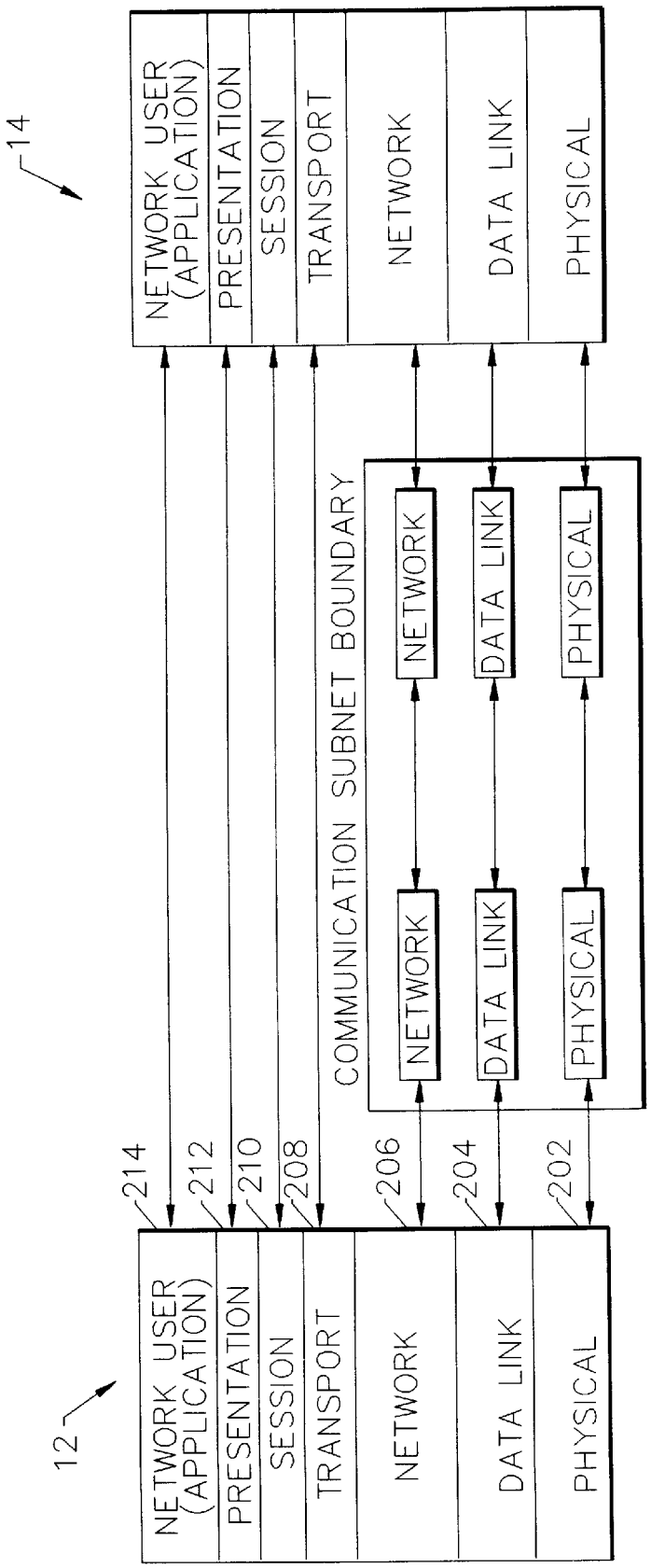
FIG. 2 is a schematic block diagram illustrating the network protocol layers of a communications stack for the OSI model which may be implemented on the communications system illustrated in FIG. 1.
Figure 3:
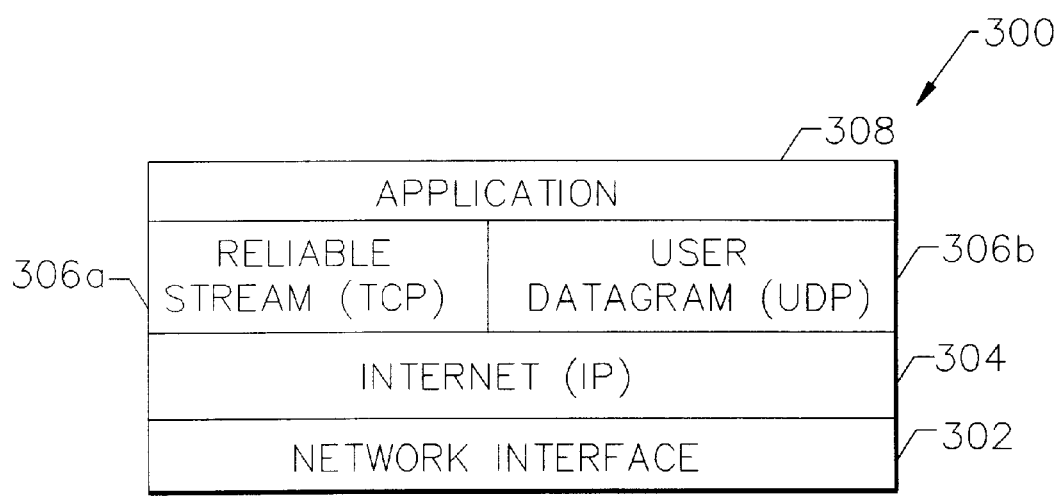
FIG. 3 is a schematic block diagram illustrating the conceptual layering of the transport layer protocols which may be implemented on the communications system illustrated in FIG. 1, including the TCP and UDP protocols.

The present invention now will be described more fully hereinafter with reference to the accompanying drawings, in which a preferred embodiment of the present invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Overview: Expand User Datagram Protocol

The present invention can overcome the problems of latency, throughput and data loss avoidance in unstable communications networks including, for example, hybrid networks which combine wired networks and wireless networks by providing an expanded User Datagram Protocol, which may be referred to as "UDPe." The UDPe transport protocol according to the present invention resends discarded data and reorders out of order data even though it is based on an unreliable network protocol such as the IP protocol and an unreliable transport protocol such as the UDP protocol. This is achieved through the use of positive acknowledgement, retransmissions and packet reordering to facilitate a reliable communications link. This is accomplished by dynamically changing the round trip time ("RTT") timer as a function of the experienced latency and the trustworthiness of the communications link. The RTT timer is set to the expected RTT prior to the transmission of data. As a result, by modifying the expected RTT and by retransmitting data when actual data loss is detected, data may be reliably transmitted across a communications link.

The expected RTT is modified by biasing the expected RTT to that of the maximum network latency experienced across the particular communications link to account for latency fluctuations in an otherwise unreliable network and accounting for the size of the data packets being sent on the communications link. In addition, the UDPe protocol according to the present invention adopts an aggressive data retransmission strategy only when data loss is actually detected unlike TCP which assumes that a data packet has been lost upon the expiration of the RTT timer and unlike UDP which does not account for data loss. An increase in the latency experienced by a sending station on a particular communications link is not necessarily an indication of data loss. Rather, an increase in latency may be due to various buffering algorithms or prioritized transmissions incorporated in various wireless network routing protocols and, in particular, a network protocol used across a communications link from a radio tower to an RF modem. For example, the receiving station on the communications link may have given a higher priority to other data packets, which consequently increases the latency experienced by the sending station. As a result, resending the data packet may be an unnecessary action. Nonetheless, when data loss does occur, an aggressive retransmission strategy is adopted by the UDPe protocol in order to avoid degradation of throughput.

According to the present invention, the expected RTT associated with the sending station is biased towards the maximum latency experienced by the sending station across the communications link with the receiving station in order to address the fluctuations that occur in an unreliable communications network.

Thus, if the current latency associated with the data packet presently being transmitted from the sending station to the receiving station exceeds the prior expected RTT determined by the sending station, the sending station will modify the current expected RTT to obtain a new expected RTT. In this situation, the current expected RTT is increased by a factor corresponding to the upward fluctuation in the latency experienced by the sending station on the particular communications link with the receiving station. On the other hand, if the current latency experienced by the sending station on the communications link from the receiving station is less than the prior expected RTT, the sending station will modify the expected RTT by a factor to reduce the latency. As a result, the expected RTT will approach the maximum experienced fluctuation in the latency experienced by the sending station on the communications link with the receiving station. Moreover, the number of retransmissions of the data packet by the sending station and the number of acknowledgements received by the sending station from the receiving station will be reduced.

Acknowledgements may be transmitted by the receiving station either in combination with user data (i.e., piggyback on a data packet), or individually, separate and apart from a data packet (i.e., non-piggyback). In addition, acknowledgements may be sent by a receiving station when an acknowledgement timer expires. The acknowledgement timer of the receiving station has a direct relationship with the expected RTT of the sending station. As a result, if the expected RTT of the sending station increases, the acknowledgement timer of the receiving station also increases. Similarly, if the expected RTT of the sending station decreases, the acknowledgement timer of the receiving station likewise is decreased. This relationship between the expected RTT of the sending station and the acknowledgement timer of the receiving station permits "good" links to implement more piggyback acknowledgements. Thus, the expected RTT impacts the number and frequency of retransmissions and acknowledgements. Moreover, minimization of non-piggy-backed acknowledgements significantly reduces internal packet fragmentation and thus improves throughput.

The present invention also accounts for data packet sizes, and the impact that data packet sizes have on unstable networks, such as, for example, wireless networks. The UDPe according to the present invention accounts for the data packet size when modifying the expected RTT of the sending station. The sending station tracks not only the average size of the data packets that are transmitted but also the actual size of the data packet currently being transmitted. If the size of the data packet currently being transmitted is an order of magnitude greater than the average transmitted packet size, the sending station accounts for this increase by extrapolating the expected RTT. As a result, unnecessary retransmissions which may be caused by an increase in data packet sizes may be avoided.

The UDPe protocol according to the present invention also accommodates fragmentation of data packets during processing in the communications stack. The present invention allows the maximum transmission unit ("MTU") to be set to the fixed packet size of the underlying network. As a result, packet fragmentation which may otherwise occur during processing in the layers of the communications stack may be reduced significantly.

Still further, the present invention controls data retransmission by adopting an aggressive retransmission strategy only when data loss is actually detected rather than when data loss may be implied due to an increase in latency experienced by a sending station. This is accomplished by a "trust" flag which is set by the receiving station. The trust flag represents an indication by the receiving station as to whether the sending station should "trust" the communications link between the sending station and the receiving station. Thus, if the receiving station indicates that the sending station can "trust" the communications link, the sending station can adjust the expected RTT and trust factor accordingly. Thus, the trust flag essentially allows a receiving station to notify the sending station to "trust" the communications link.

Excessive expected RTT modifications leads to corresponding changes in the trust factor. For example, the sending station reduces the trust factor upon the reception of an acknowledgement if the sending station had retransmitted the particular data packet and the trust flag was cleared by the receiving station.

The trust flag according to the present invention may be illustrated by way of an example. Assume that the sending station retransmits a data packet six times. If the receiving station receives all six of the data packet retransmissions, the receiving station believes that the link is better than the sending station otherwise believes. As a result, the receiving station sets the "trust" flag in its next transmission. If the sending station receives an acknowledgement and a trust flag that has been set by the receiving station, the sending station will double its original (i.e., nonregraded) expected RTT, and increase the trust factor by increments of "0.1" to a maximum of "1.5." As a result, the number of retransmissions implemented by the sending station and the acknowledgements that will be sent by the receiving station will be reduced.

By way of further example, assume that the sending station transmits ten data packets with eight lost packets (i.e., eight of the ten data packets must be retransmitted). The receiving station will not set the trust flag on the next transmitted packet back to the sending station. Upon receiving a cleared trust flag from the receiving station (i.e., a trust flag acknowledging the retransmission of a data packet), the sending station decreases its trust factor by "0.1" to a minimum of "0.5" leading to a more aggressive retransmission strategy (i.e., dynamic regradation of expected RTT).

UDPe Protocol Header Design

Figure 4:
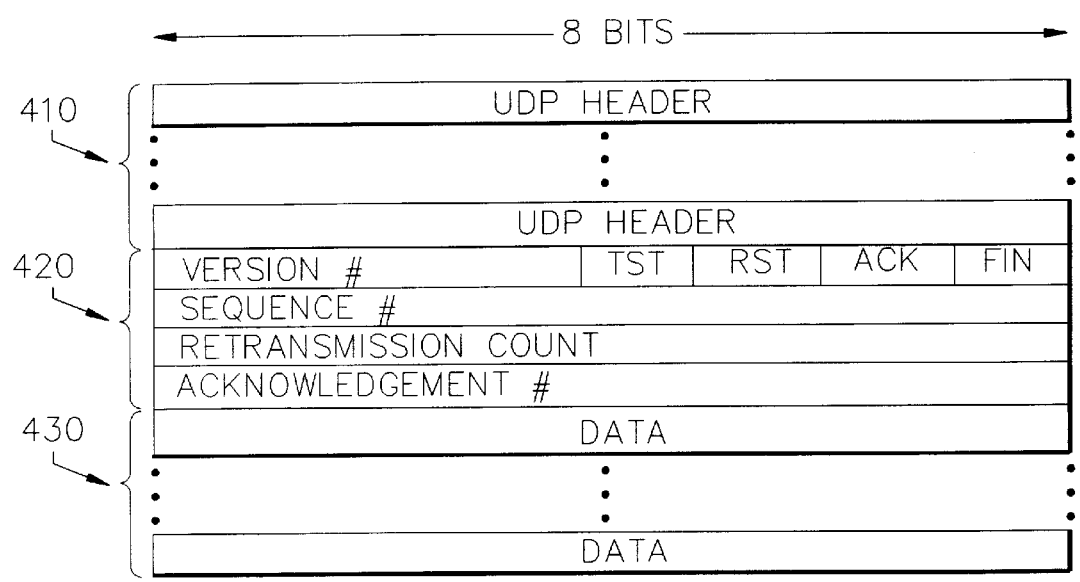
FIG. 4 is a schematic diagram illustrating the format of the expanded UDP protocol header utilized for reliably transmitting data on a communications link according to the present invention.

Referring now to FIG. 4, a UDPe protocol header design according to the present invention will now be described. The UDPe header which is illustrated generally at 420 is four bytes in length. Each byte has eight bits. As illustrated in FIG. 4, the UDPe header is wrapped by a UDP header which is illustrated generally at 410 and is eight bytes in length. Thus, the total transport header combining the UDP header of the prior art and the UDPe header according to the present invention results in a twelve byte transport header. The UDP header 410 and UDPe header 420 sit on top of the data packet 430.

As illustrated in FIG. 4, each byte of the UDPe header 420 has eight bits. The fields in the UDPe header include the following: Version #, TST (i.e., Trust flag), RST (i.e., Reset flag), ACK (i.e., Acknowledgement flag), FIN (i.e., Finish flag), Sequence #, Retransmission Count, and Acknowledgement #. The UDPe header is generally compact and permits vital information to be transmitted from the sending station to the receiving station and back from the receiving station to the sending station to allow for the reliable delivery of data packets, and packet discardation resolution.

More specifically, the Version #, which is four bits, indicates the highest protocol version for the UDPe version supported by the sending station.

The TST flag is one bit in length and is set by the receiving station to indicate to the sending station that the sending station can "trust" the communications link. If the receiving station has acknowledged a retransmitted packet and the TST bit is clear, the sending station will decrement the "trust factor" by "0.1." In other words, the sending station will trust the communications link less. If the receiving station sets the TST flag indicating that the receiving station believes that the communications link can be trusted, the sending station will increment the trust factor by "0.1."

The RST flag is a one bit field which is set by the sending station if a communications link is requested between the sending station and the receiving station. The FIN flag is a one bit flag which may be set by either the sending station or the receiving station if either station desires to terminate the communications link between two stations. The ACK flag also is a one bit flag. It is set by the receiving station upon the receipt of a data packet to acknowledge the receipt of the data packet.

The Sequence # is eight bits long and identifies the current packet. This field is used in reordering of the data packets and also to identify the data packets so that the receiving station can determine whether the particular data packet has been received previously so that the receiving station may set the TST flag. The Retransmission Count field is an eight bit field which indicates the number of times the current packet (i.e., the current Sequence #) has been retransmitted by the sending station.

Finally, the Acknowledgement # is an eight bit field which is valid when the ACK flag is set. It represents the Sequence # of the next packet which the receiving station expects to receive. Thus, the Acknowledgement # acknowledges the receipt by the receiving station of a data packet having the Sequence # which is equal to the Acknowledgement # minus 1.

Thus, the Version #, Sequence #, Acknowledgement #, Reset flag, Acknowledgement flag and Finish flag are utilized for connection establishment, reliable delivery and connection termination. The Retransmission Count and the Trust flag are utilized for packet discardation resolution. In addition, "peer" computers (i.e., a sending station and receiving station pair) may relay data loss information to one another if they have not received an expected data packet via the trust flag.

FIGS. 5–9 are flow charts and flow diagrams illustrating the methods, systems, and program products according to the present invention. It will be understood that each step or flow of the flow charts and flow diagrams, and combinations of the steps or flows in the flow chart diagrams, can be implemented by computer program instructions. These computer program instructions may be loaded onto a computer or other programmable data processing apparatus to produce a machine such that the instructions which execute on the computer or other programmable apparatus create means for implementing the functions specified in the flow chart or flow diagram step(s) or flow(s). These computer program instructions may also be stored in a computer readable memory that can direct a computer or other programmable apparatus to function in a particular manner, such that the instructions stored in the computer readable memory produce an article of manufacture including instruction means which implement the functions specified in the flow chart or flow diagram step(s) or flow(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps or flows for implementing the functions specified in the flow chart or flow diagram step(s) or flow(s).

Accordingly, steps or flows of the flow chart and flow diagram illustrations support combinations of means for performing the specified functions, combinations of steps for performing the specified functions and program instruction means for performing the specified function. It will also be understood that each step or flow of the flow chart or flow diagram illustrations, and combinations of steps or flows in the flow chart and flow diagram illustrations, can be implemented by special purpose hardware based computer systems which perform the specified functions or steps, or combinations of special purpose hardware and computer instructions.

Detailed Operation: RTT Modification

Figure 5:
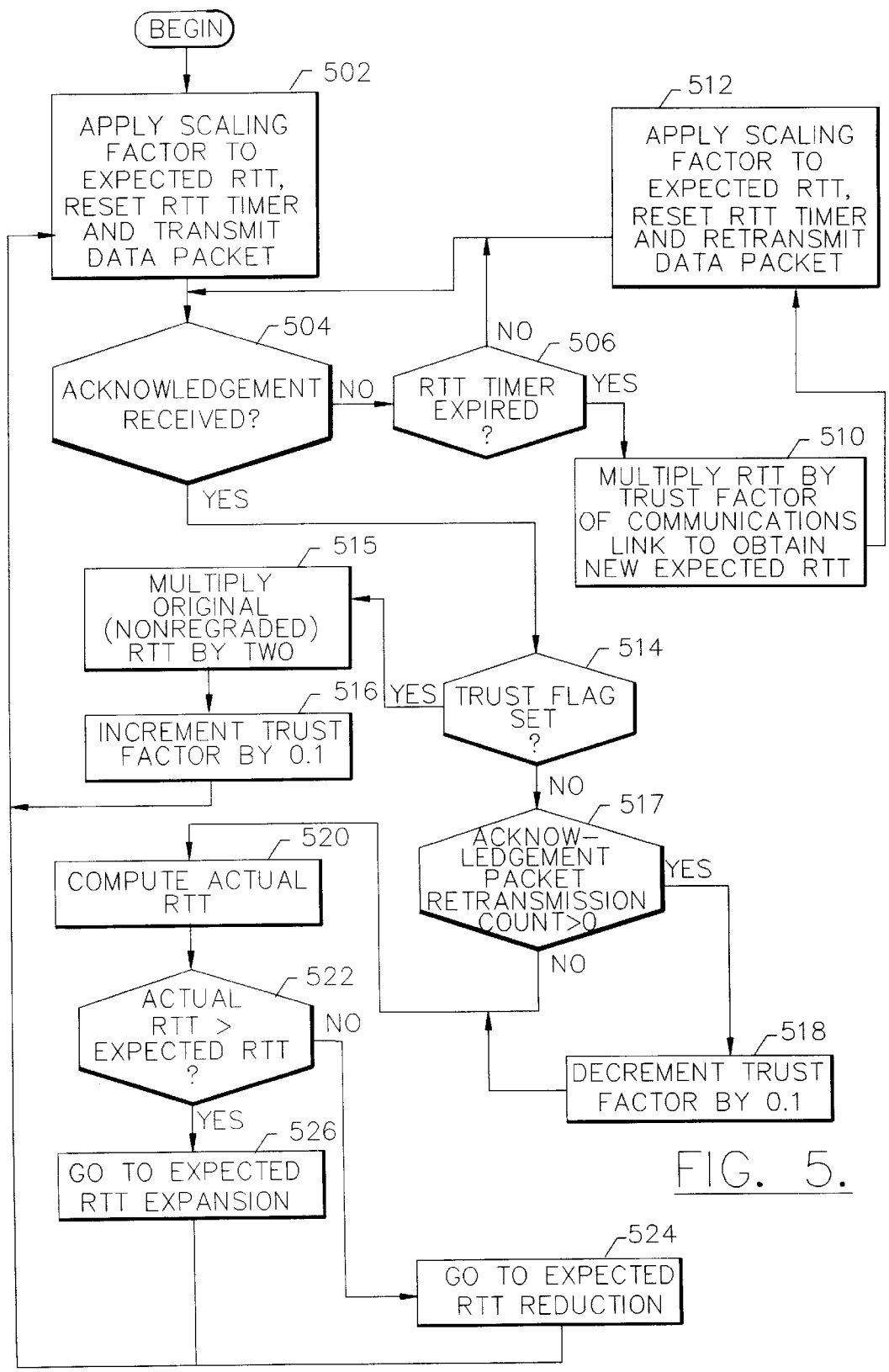
FIG. 5 is a flow chart representation illustrating the operations according to the present invention for modifying the expected round trip time to enable the reliable transmission of data over a communications link while relatively minimizing the number of retransmissions.
Figure 6:
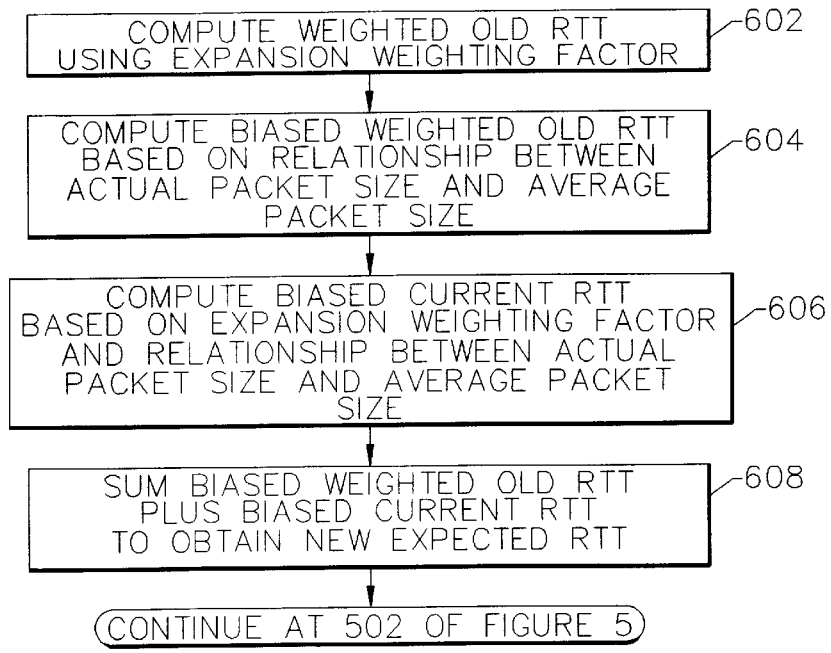
FIG. 6 is a flow chart representation illustrating the operations according to the present invention for expanding the expected round trip time.
Figure 7:
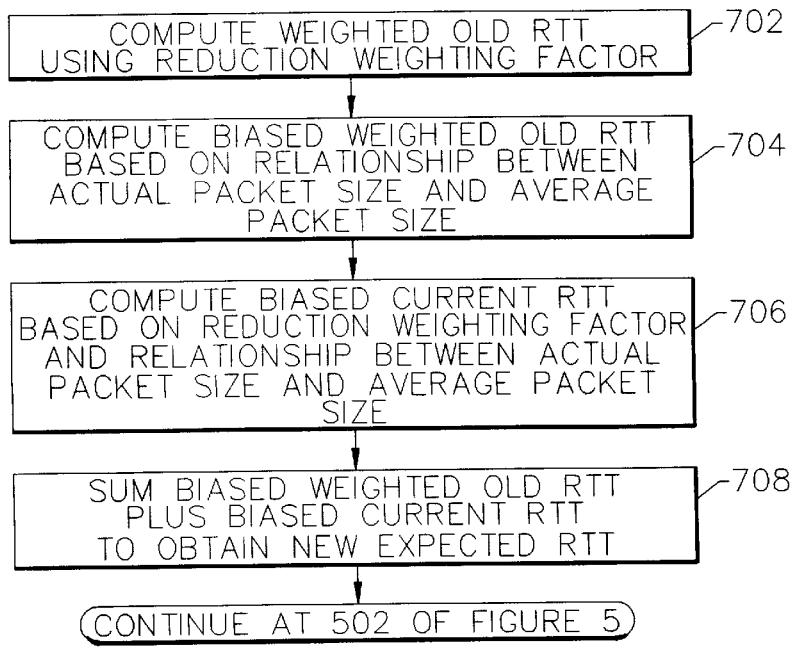
FIG. 7 is a flow chart representation illustrating the operations according to the present invention for reducing the expected round trip time.

Referring now to FIGS. 5–7, flow charts illustrating the operations of the present invention for modifying the expected RTT will now be described. FIG. 5 illustrates the general modification of the expected RTT while FIG. 6 illustrates the expansion of the expected RTT and FIG. 7 illustrates the reduction of the expected RTT.

Referring now to FIG. 5, the expected RTT processing will be described from the perspective of the sending station. The sending station scales the expected RTT by applying a scaling factor, resets the RTT timer and transmits a data packet at 502. A determination is made at 504 as to whether an acknowledgement has been received from the receiving station indicating that the receiving station received the data packet. If it is determined at 504 that no acknowledgement was received, a determination is then made at 506 as to whether the sending station's RTT timer has expired. If it is determined at 506 that the RTT timer has not expired, the sending station continues to wait for the receipt of an acknowledgement that the receiving station received the data packet. If it is determined at 506 that the RTT timer expired, the sending station multiplies the expected RTT by the trust factor for the particular communications link at 510. The sending station then applies the scaling factor to the regraded expected RTT, resets the RTT timer to the new expected RTT and retransmits the data packet at 512. Thereafter, the sending station repeats the process by making a determination at 504 as to whether an acknowledgement to the retransmitted data packet has been received.

If the sending station determines at 504 that an acknowledgement to the transmitted data packet was received, a determination is then made at 514 as to whether the trust flag was set by the receiving station. If the trust flag was set by the receiving station, the sending station then multiplies the original (i.e., nonregraded) RTT by two at 515 and increments the trust factor by "0.1" at 516. Thereafter, the sending station then proceeds to transmit additional data packets at 502 as necessary.

If it is determined at 514 that the trust flag was not set by the receiving station, a determination is then made at 517 as to whether the acknowledged packet had a retransmission count greater than 0 (i.e., whether the data packet was retransmitted). If it is determined that the retransmission count for the data packet was greater than 0, the trust factor is decremented by "0.1" at 518 and the sending station proceeds to compute the actual RTT for the transmitted data packet at 520. If it is determined at 517 that the retransmission count is equal to 0 (i.e., the data packet was not retransmitted), the sending station simply proceeds to computer the actual RTT for the transmitted data packet at 520.

Thereafter, the sending station determines at 522 whether the actual RTT is greater than the expected RTT at 522. If the sending station determines that the actual RTT is not greater than the expected RTT, the sending station then proceeds with the expected RTT reduction processing at 524 which will be described with respect to FIG. 7. If the sending station determines that the actual RTT is greater than the expected RTT, the sending station then proceeds with expected RTT expansion at 526 which will be described with respect to FIG. 6.

After completion of either the expected RTT reduction processing or expected RTT expansion processing, the sending station then proceeds to transmit additional data packets at 502 as necessary.

Referring to FIG. 6, processing of the expected RTT expansion will now be described. The sending station computes a weighted expected RTT using an expansion weighting factor at 602. In addition, a biased weighted expected RTT is also computed based on the relationship between the actual packet size and the average packet size at 604. Thereafter, the sending station computes a biased current RTT based on the expansion weighting factor and the relationship between the actual packet size and the average packet size at 606. The computation process is completed by the sending station at 608 by summing the biased weighted expected RTT and the biased current RTT to obtain the new expected RTT. Thereafter, the sending station continues the transmission process as necessary at 502 of FIG. 5.

Referring to FIG. 7, expected round trip time reduction processing by the sending station will now be described. The sending station begins processing at 702 by computing a weighted expected RTT using a reduction weighting factor. It then computes a biased weighted expected RTT based on the relationship between the actual packet size and the average packet size at 604. The sending station continues processing by computing a biased current RTT based on the reduction weighting factor and the relationship between the actual packet size and the average packet size at 706. Thereafter, the sending station sums the biased weighted expected RTT plus the biased current RTT at 708 to obtain the new expected RTT. Thereafter, the sending station continues the transmission of data packets as necessary at 502 of FIG. 5.

Expected RTT Computations

The processing of FIGS. 5–7 may be illustrated by reference to several equations. As previously indicated, the expected RTT indicates how long the sending station will wait before resending an unacknowledged data packet. In modifying the expected RTT, the sending station determines the actual RTT which is the RTT for the most recently acknowledged data packet. If the actual RTT is greater than the expected RTT (i.e., the previously expected RTT), the sending station recognizes an expected RTT expansion condition and proceeds to expand the expected RTT. Otherwise, the sending station recognizes an expected RTT reduction condition and will proceed with the processing to reduce the expected RTT.

The expected RTT is expanded using an expansion weighting factor ("α+") of 0.1 and the following process:

$$Exp.\ RTT_{(new)} =$$
$$(Exp.\ RTT_{(old)} * (\alpha + * (1 - (Packet_{(Act)} / (Packet_{(Act)} + Packet_{(Avg)})))))+$$
$$(RTT_{(Act)} * (1 - (\alpha + * (1 - (Packet_{(Act)} / (Packet_{(Act)} + Packet_{(Avg)}))))))$$

An example of the processing by the sending station for expanding the expected RTT will be described with respect to FIG. 8.

The expected RTT is reduced using a reduction weighting factor ("α–") of 0.9 and the following process:

$$Exp.\ RTT_{(new)} =$$
$$(Exp.\ RTT_{(old)} * (\alpha - * (1 - (Packet_{(Act)} / (Packet_{(Act)} + Packet_{(Avg)})))))+$$
$$(RTT_{(Act)} * (1 - (\alpha - * (1 - (Packet_{(Act)} / (Packet_{(Act)} + Packet_{(Avg)}))))))$$

Figure 8:
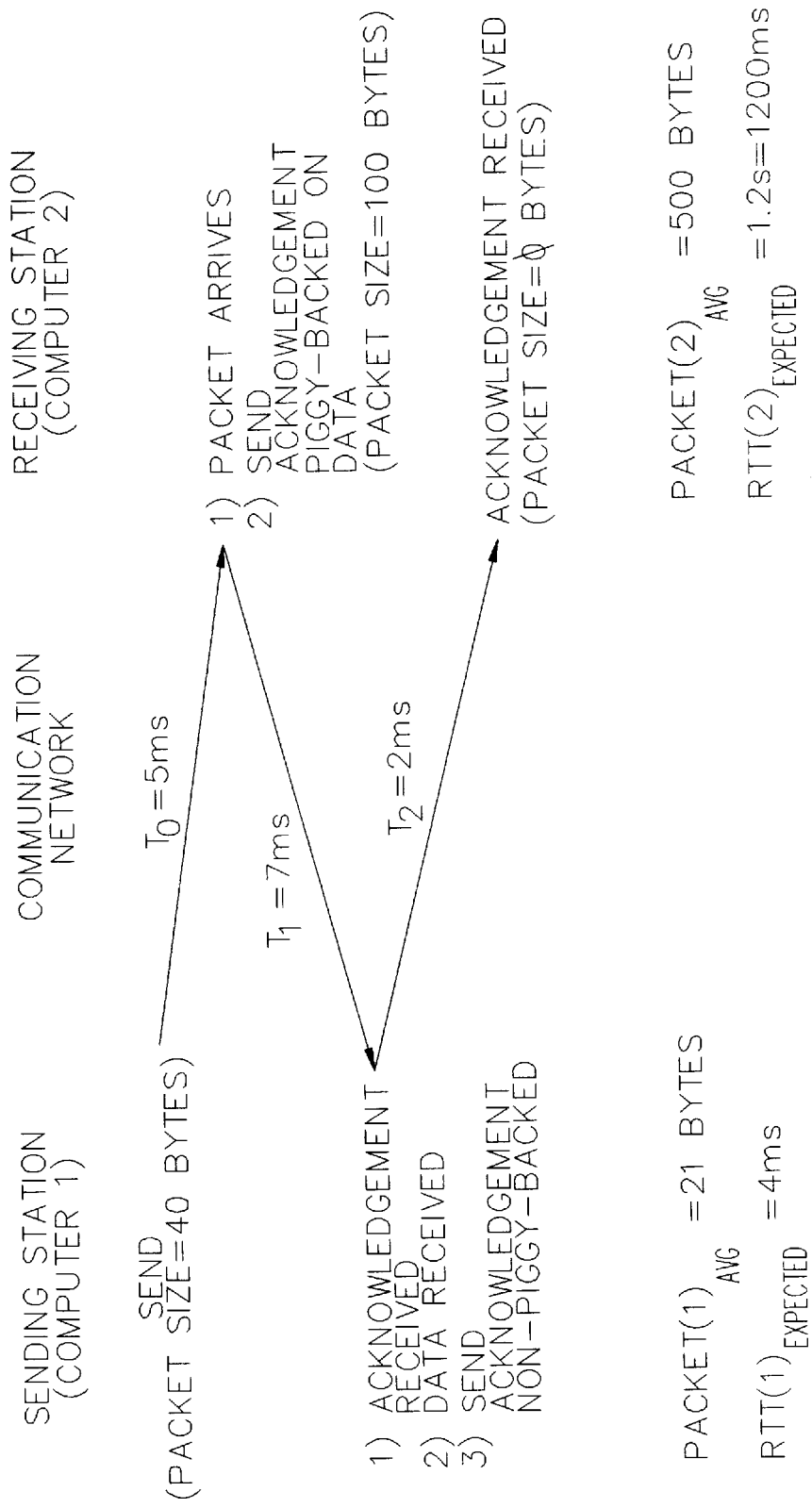
FIG. 8 is a flow diagram illustrating the operations of the present invention during modification of the round trip time in processing a communications experiencing both round trip time expansion and round trip timer reduction.

An example of the processing by the sending station for reducing the expected RTT will also be described with respect to FIG. 8.

EXAMPLE

Expected RTT Expansion and Expected RTT Reduction

Referring now to FIG. 8, a flow diagram illustrating the operations of the present invention during modification of the RTT and processing transmissions experiencing expected RTT expansion and expected RTT reduction will now be described. As illustrated in FIG. 8, the sending station which may be referred to as "computer 1" transmits packets having an average packet size of 21 bytes. In addition, the sending station has an expected RTT of 4 milliseconds ("ms"). The sending station transmits a data packet having a size of 40 bytes over the communications network to the receiving station which may be referred to as "computer 2." The receiving station receives the data packet, and transmits an acknowledgement back to the sending station.

The time ($T_0$) elapsed for the transmission of the data packet from the sending station to the receiving station is 5 ms. The time ($T_1$) elapsed for the acknowledgement to be sent from the receiving station back to the sending station is 7 ms. The sending station then proceeds to calculate the actual RTT for the first data packet. The actual RTT equals 12 ms (i.e., 5 ms+7 ms). The sending station determines that the actual RTT of 12 ms is greater than the expected RTT of 4 ms.

As a result, the sending station proceeds to expand the expected RTT so that the expected RTT will approach the highest latency (in this case, 12 ms) experienced by the sending station. The sending station computes the new expected RTT using the process previously provided for RTT expansion processing as follows:

$$Exp.\ RTT\ (new) = (4\ ms * (0.1 * (1 - (40/(40+21)))))+$$
$$(12\ ms * (1 - (0.1 * (1 - (40/(40+21))))))$$
$$= 11.897\ ms$$

Thereafter, the sending station resets its expected RTT to the newly computed and expanded expected RTT prior to the transmission of another data packet.

Still referring to FIG. 8, an example of the processing by the present invention for reducing the expected RTT is also illustrated. In this reduction example, computer 2 is actually the sending station. Computer 2 piggybacks the acknowledgement to computer 1's data packet onto its own data packet. The average size of the data packets transmitted by computer 2 is 500 bytes. In addition, the expected RTT previously computed by computer 2 is 1.2 seconds or 1200 ms. The data packet transmitted by computer 2 onto which the acknowledgement was piggyback has a size of 100 bytes.

The transmission time ($T_1$) for transmitting computer 2's data packet from computer 2 back to computer 1 is 7 ms. Computer 1 receives the data packet transmitted by computer 2 and sends an acknowledgement back to computer 2. The acknowledgement is sent back by computer 1 in a non-piggyback packet. The transmission time ($T_2$) for the acknowledgement sent from computer 1 to computer 2 is 2 ms.

Upon receiving the acknowledgement and determining that the size of the acknowledgement packet is 0 bytes because it is a non-piggyback acknowledgement, computer 2 begins processing to determine the biasing or recomputation of the expected RTT. Computer 2 determines the actual RTT for the transmission of its 100 byte data packet to be 9 ms (i.e., 7 ms+2 ms). As a result, computer 2 determines that the actual RTT of 9 ms is less than the expected RTT of 1200 ms. As a result, computer 2 begins processing the reduction of the expected RTT. The computation for reduction of the RTT by computer 2 is as follows:

$$Exp.\ RTT\ (new) = (1200\ ms * (0.9 * (1 - (100/(100+500)))))+$$
$$(9\ ms * (1 - (0.9 * (1 - (100/(100+500))))))$$
$$= 902.25\ ms$$

After completing this processing, the receiving station will then continue transmitting data using its newly computed RTT.

EXAMPLE

Dynamic Regradation of RTT

Figure 9:
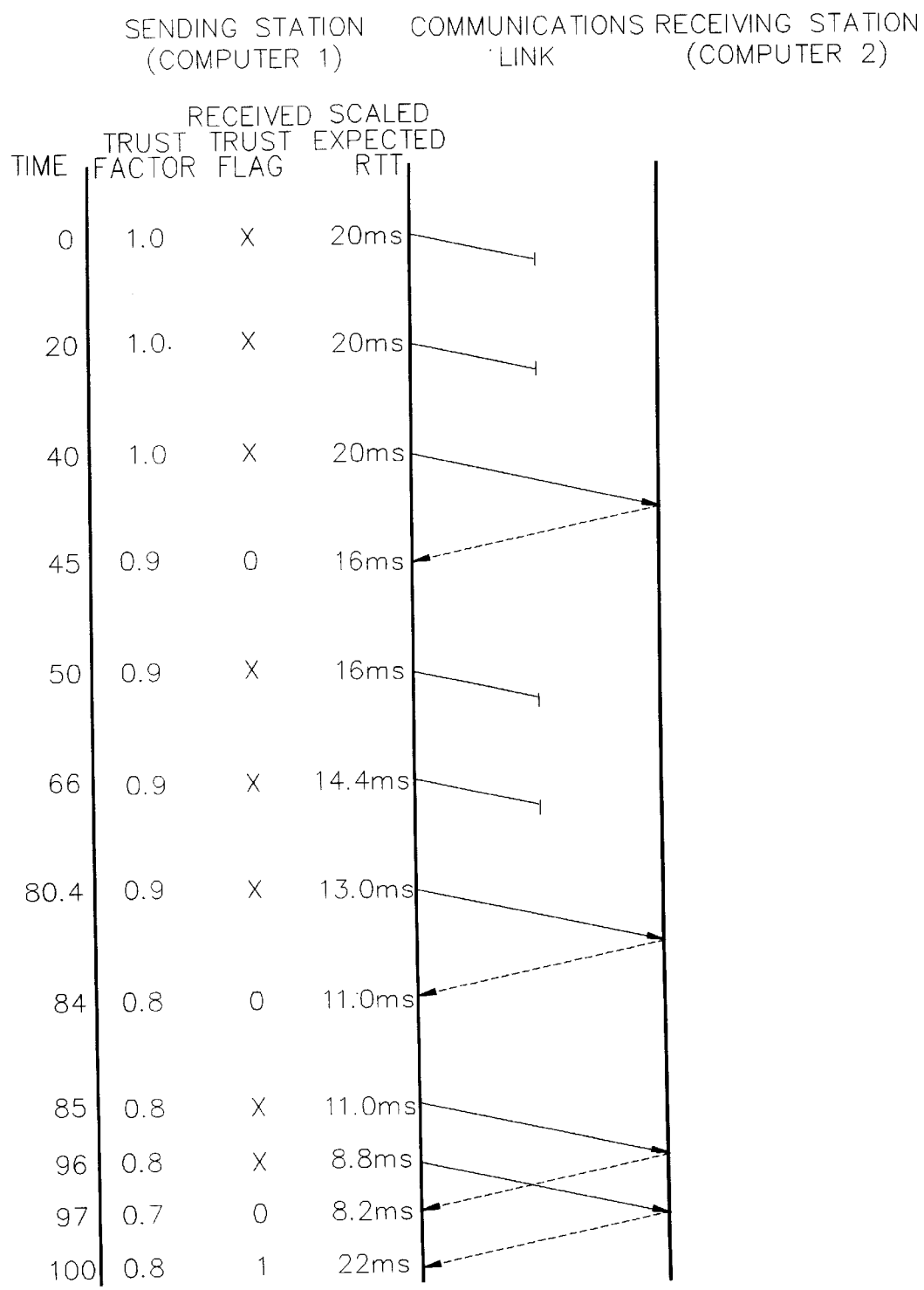
FIG. 9 is a flow diagram illustrating the operations according to the present invention in processing the dynamic regradation of the round trip time in processing a communications experiencing several occurrences of lost data.

Referring now to FIG. 9, the operations of the present invention in processing the dynamic regradation of the expected RTT will be described with respect to an example in which the communications network experiences several occurrences of lost data. As previously indicated, the expected RTT indicates how long the sending station will wait before resending an unacknowledged data packet. In this example, the expected RTT has been scaled by a factor of 2.0. In addition, the trust factor is a field that is maintained by the sending station, in this example, computer 1, and is indicative of the extent to which the sending station (e.g., computer 1) may trust the communications link. The trust factor, which is initially set to "1.0," is used as a multiplier for the expected RTT before each retransmission of a data packet. As a result, the expected RTT is regraded before each retransmission of a data packet by multiplying the old expected RTT times the trust factor.

In the example illustrated in FIG. 9, the sending station has an initial expected RTT of 10 ms and a trust factor of 1.0. The sending station transmits a data packet at time T=0. In this example, the first data packet is lost. The sending station waits for a time period of the scaled expected RTT (i.e., 20 ms) before trying to retransmit the first data packet. After waiting this period of time, the sending station multiplies the expected RTT by the trust factor, resets the RTT timer and retransmits the first data packet at time T=20 ms. The sending station again waits for a period of the scaled expected RTT (i.e., 20 ms) to determine whether the first data packet should be retransmitted. Since no acknowledgement is received by the sending station during this waiting period, the sending station multiplies the expected RTT by the trust factor, resets the RTT timer and retransmits the first data packet again at time T=40 ms.

The receiving station receives the first data packet shortly after it is transmitted the third time by the sending station, and sends an acknowledgment signal to the sending station. The receiving station, using the Retransmission Count in the UDPe header to recognize that the first data packet was actually retransmitted twice, realizes that the communications link cannot be trusted. As a result, the receiving station does not set the TST flag in the UDPe header before sending the acknowledgment back to the sending station.

The sending station receives the acknowledgment at time T=45 ms. Upon receipt of the acknowledgement, the sending station determines that the TST flag was not set in the UDPe header by the receiving station and, therefore, the communications link cannot be trusted. In addition, the sending station determines that the retransmission count was greater than 0 and, therefore, decrements its trust factor by 0.1 so that the trust factor now has a value of 0.9. In addition, the sending station also recomputes the expected RTT using the process described with respect to FIGS. 5–8 to obtain a scaled expected RTT of 8 ms.

The sending station then transmits a second data packet at time T=50 ms. The sending station waits for a period of the new scaled expected RTT (i.e., 16 ms), to determine whether the data packet was received. Upon determining that no acknowledgment has been received during this waiting period, the sending station multiplies the expected RTT by the trust factor to obtain a new expected RTT of 7.2 ms and applies the scaling factor to the new expected RTT. The sending station then retransmits the second data packet at time T=66 ms.

Thereafter, the sending station waits for a period of the new scaled expected RTT before concluding that the second data packet has been lost again. As a result, at time T=80.4 the sending station multiplies the expected RTT by the trust factor, and applies the scaling factor to the new expected RTT. Thereafter, the sending station retransmits the second data packet at time T=80.4 ms.

Shortly after this third transmission (i.e., second retransmission) of the second data packet, the receiving station receives the second data packet and sends an acknowledgment to the sending station. However, before sending the acknowledgment, the receiving station recognizes that the data packet which it received was actually retransmitted two different times before it was received by the receiving station as a result of the Retransmission Count in the UDPe header. Thus, the receiving station does not set the TST flag. Therefore, upon receipt of the acknowledgment in the UDPe header at time T=84 ms, the sending station determines that the TST flag has not been set indicating that the receiving station believes that the communications link cannot be trusted. In addition, the sending station determines that the retransmission count is greater than 0 and decrements the trust factor by 0.1 such that the trust factor now has a value of 0.8.

Thereafter, the sending station recomputes the expected RTT using the process described with respect to FIGS. 5–8. As a result, the new expected RTT is 5.5 ms. Subsequently, the sending station applies the scaling factor to the new expected RTT and transmits a third data packet at time T=85 ms. The receiving station receives the third data packet and sends an acknowledgement to the sending station. The receiving station, upon receiving the third data packet, determines that the third data packet was received on the first transmission attempt based on the Retransmission Count field in the UDPe header (i.e., retransmission count equals 0) and, as a result, does not set the TST flag in the UDPe header.

Having not received an acknowledgement, the sending station multiplies the expected RTT by the trust factor and applies the scaling factor to the result, to obtain a new scaled expected RTT of 8.8 ms. Thereafter, the sending station resets the RTT timer and retransmits the first data packet again at time T=96 ms. Before an acknowledgement is received to the retransmission of this third data packet, however, the sending station receives the acknowledgement from the receiving station for the first transmission of the third data packet at time T=97 ms. Upon receipt of the acknowledgement to the first transmission of the third data packet at time T=97 ms, the sending station determines that the trust flag was not set by the receiving station. In addition, the sending station determines that the retransmission count is greater than 0 since the sending station retransmitted this third data packet, and consequently, decrements the trust factor by 0.01 to obtain a new trust factor of 0.7.

Shortly thereafter, the receiving station receives the third data packet a second time. The receiving station determines that the third data packet has already been received once and, therefore, the communications link can be trusted. As a result, the receiving station sets the trust flag in the UDPe header to 1. Thereafter, the sending station receives the acknowledgement from the receiving station at time T=100 ms. The sending station determines that the trust flag was set by the receiving station indicating that the receiving station believes that the communications link can be trusted. As a result, the sending station multiplies the original (nonregraded) RTT by 2 and scales the new expected RTT to obtain a new scaled expected RTT of 22 ms. In addition, the sending station increments the trust factor by 0.1 to obtain a new trust factor of 0.8.

Finally, although the present invention currently uses "Telnet Interception" which is interactive, it will be understood by those skilled in the art that the UDPe protocol according to the present invention may be expanded to accommodate "Nagle" like algorithms.

In the drawings and specification, there have been disclosed typical preferred embodiments of the preferred invention and, although specific terms are employed, they are used in a generic and descriptive sense only and not for purposes of limitation, the scope of the invention being set forth in the following claims.

That which is claimed:

1. A method for reliably managing the transmission of a plurality of data packets over a communications link between a first computer and a second computer, the method comprising the step of:

controlling retransmission of the data packets between the first computer and the second computer over the communications link based on a biased expected round trip time associated with the first computer, the biased expected round trip time being biased as a function of fluctuations in the latency of transmissions of the data packets between the first computer and the second computer, whereby data packets are reliably transmitted between the first computer and the second computer and the number of retransmissions of data packets is relatively minimized.

2. The method according to claim 1 wherein said controlling step comprises the steps of:

modifying the expected round trip time associated with the first computer based on the largest latency of the first computer corresponding to the transmitting step and the size of the data packets successfully transmitted between the first computer and the second computer; and controlling the retransmission of data packets between the first computer and the second computer over the communications link based on the modified expected round trip time associated with the first computer.

3. The method according to claim 2 wherein said modifying the expected round trip time step comprises the steps of:

comparing the expected round trip time and an actual round trip time corresponding to the actual time between the transmitting of one of said data packets by the first computer and a determination by the first computer that the one of said data packets was transmitted successfully; and modifying the expected round trip time in response to the comparing step and the size of the one data packet successfully transmitted between the first computer and the second computer.

4. The method according to claim 3 wherein said modifying step comprises the steps of:

expanding the expected round trip time if the actual round trip time is at least as great as the expected round trip time;

reducing the expected round trip time if the expected round trip time is greater than the actual round trip time.

5. The method according to claim 1 wherein said controlling step comprises the steps of:

dynamically regrading the expected round trip time associated with the first computer, the expected round trip time being dynamically regraded as a function of the successful transmission of a first data packet between the first computer and the second computer; and controlling the retransmission of a second data packet between the first computer and the second computer over the communications link based on the dynamically regraded expected round trip time associated with the first computer.

6. The method according to claim 5 wherein said dynamically regrading step comprises the steps of:

determining that the communications link between the first computer and the second computer is reliable or unreliable;

dynamically increasing the expected round trip time associated with the first computer if the communications link between the first computer and the second computer is reliable; and dynamically decreasing the expected round trip time associated with the first computer if the communications link between the first computer and the second computer is unreliable.

7. The method according to claim 1 wherein said first computer has an application comprising a web server and said second computer has an application comprising a web browser.

8. The method according to claim 1 wherein the communications link comprises at least one of a wireless communications link, a wired communication link, and the combination of a wired communications link and a wireless communications link.

9. The method according to claim 1 wherein said controlling step comprises the steps of:

acknowledging that data packets were received by the second computer;

determining the actual round trip time associated with each of said data packets transmitted to the second computer;

modifying the expected round trip time associated with the first computer as a function of the actual round trip time of the first computer and the size of the data packets successfully transmitted between the first computer and the second computer; and controlling the retransmission of data packets between the first computer and the second computer over the communications link as a function of the modified expected round trip time associated with the first computer.

10. The method according to claim 9 wherein said modifying the expected round trip time step comprises the steps of:

comparing the expected round trip time and an actual round trip time corresponding to the actual time between transmitting of one of said data packets from the first computer to the second computer and a determination by the first computer that the one of said data packets was transmitted successfully; and modifying the expected round trip time in response to the comparing step and the size of the one data packet successfully transmitted between the first computer and the second computer.

11. The method according to claim 10 wherein said modifying step comprises the steps of:

expanding the expected round trip time if the actual round trip time is at least as great as the expected round trip time; and reducing the expected round trip time if the expected round trip time is greater than the actual round trip time.

12. The method according to claim 5 wherein said dynamically regrading step comprises the steps of:

determining that the communications link between the first computer and the second computer is reliable or unreliable; and notifying the first computer that the communications link between the first computer and the second computer is one of reliable and unreliable in response to the determining step.

13. A computer program product for reliably managing the transmission of a plurality of data packets over a communications link between a first computer and a second computer, the computer program product comprising:

a computer readable storage medium having computer readable code means embodied in said medium, said computer readable code means comprising:

computer instruction means for controlling retransmission of the data packets between the first computer and the second computer over the communications link based on a biased expected round trip time associated with the first computer, the biased expected round trip time being biased as a function of fluctuations in the latency of transmissions of the data packets between the first computer and the second computer, whereby data packets are reliably transmitted between the first computer and the second computer and the number of retransmissions of data packets is relatively minimized.

14. A system for reliably managing the transmission of a plurality of data packets over a communications link between a first computer and a second computer, the system comprising:

means for controlling retransmission of the data packets between the first computer and the second computer over the communications link based on a biased expected round trip time associated with the first computer, the biased expected round trip time being biased as a function of fluctuations in the latency of transmissions of the data packets between the first computer and the second computer, whereby data packets are reliably transmitted between the first computer and the second computer and the number of retransmissions of data packets is relatively minimized.

* * * * *